(12) United States Patent
Tanaka (10) Patent No.: US 7,835,268 B2
(45) Date of Patent: Nov. 16, 2010

(54) OPTICAL TERMINATION SYSTEM

(75) Inventor: Keiji Tanaka, Saitama (JP)

(73) Assignee: KDDI Corporation, Tokyo (JP)

( * ) Notice: Subject to any disclaimer, the term of this patent is extended or adjusted under 35 U.S.C. 154(b) by 742 days.

(21) Appl. No.: 11/493,100

(22) Filed: Jul. 25, 2006

(65) Prior Publication Data

US 2007/0058973 A1    Mar. 15, 2007

(30) Foreign Application Priority Data

Jul. 29, 2005    (JP)    ............................. 2005-220033

(51) Int. Cl.
   *G01R 31/08*   (2006.01)
   *G02F 1/00*    (2006.01)
(52) U.S. Cl. .......................................... 370/216; 398/1
(58) Field of Classification Search ................ 370/464, 370/465, 468; 385/53, 76; 398/7
   See application file for complete search history.

(56) References Cited

U.S. PATENT DOCUMENTS

| 6,438,707 | B1 * | 8/2002 | Ronstrom ..................... 714/13 |
| 7,061,858 | B1 * | 6/2006 | Di Benedetto et al. ...... 370/219 |
| 2002/0051455 | A1 * | 5/2002 | Lee et al. ............... 370/395.21 |
| 2002/0063918 | A1 * | 5/2002 | Kaiser et al. ................ 359/117 |
| 2004/0062256 | A1 * | 4/2004 | Takeuchi et al. ............ 370/401 |
| 2004/0141745 | A1 * | 7/2004 | Han et al. ...................... 398/58 |

FOREIGN PATENT DOCUMENTS

| JP | 63-146626 | 6/1988 |
| JP | 04-003633 | 1/1992 |
| JP | 5-136733 | 6/1993 |
| JP | 2977344 | 9/1999 |
| JP | 11-275008 | 10/1999 |
| JP | 2002-222160 | 8/2002 |
| JP | 2002-281109 | 9/2002 |
| JP | 2003-051765 | 2/2003 |
| JP | 2003-244179 | 8/2003 |

OTHER PUBLICATIONS

Abstract of Japanese Publication JP5136733, published Jun. 1, 1993 and, therefore, corresponding Japan Patent No. 2977344, in the name of Ikuo.
Office action cited in corresponding Japanese Application No. 2005-220033, dated Jun. 30, 2010, 2pp.
Japanese Office action dated Sep. 28, 2010, for corresponding Japanese Patent application 2005-220033, noting listed references in this IDS, as well as JP 04-003633 and JP 2002-222160, previously filed in an IDS dated Jul. 16, 2010.

* cited by examiner

*Primary Examiner*—Hanh Nguyen
(74) *Attorney, Agent, or Firm*—Christie, Parker & Hale, LLP (57) ABSTRACT

An optical termination system is provided. The optical termination system includes a working Optical Line Terminal (OLT) that communicates with a plurality of Optical Network Units (ONUs) near end users through an optical transmission line. The OLT includes a control information storage to store control information of the plurality of ONUs. In addition, the optical termination system includes a standby OLT, which includes a storage to store the control information to be transmitted from the working OLT. Furthermore, the optical termination system includes a controller that controls switching from the working OLT to the standby OLT.

14 Claims, 4 Drawing Sheets

OPTICAL TERMINATION SYSTEM

CROSS REFERENCE TO RELATED APPLICATIONS

This application claims priority to Japanese Patent Application No. 2005-220033, filed on Jul. 29, 2005, the entire contents of which are incorporated herein by reference.

FIELD OF THE INVENTION

This invention relates to an optical termination system having a redundant configuration in an optical transmission system.

BACKGROUND OF THE INVENTION

A Passive Optical Network (PON) system is an optical transmission system to connect an Optical Line Terminal (OLT) at a central office to a plurality of Optical Network Units (ONUs) at end user's sides through passive optical elements which consist of optical fibers and optical splitters (See, for instance, Japanese Laid-Open patent application JP2005-175599).

A PON system is now widely used not only as Internet access lines but also as a system to provide broadcasts, data communications, and data.

When a PON system is used for broadcasting and/or telephone services, its functionality is facilitated by avoiding disconnection due to the failure of network equipment. Replacement of an OLT causes temporary interruption of service to all users under the OLT.

SUMMARY OF THE INVENTION

According to an exemplary embodiment of the invention, an optical termination system includes a first OLT to communicate with a plurality of ONUs through an optical transmission line, the OLT having a control information storage to store the control information of the plurality of ONUs, a standby OLT having a storage capable of storing the control information transferred from the first OLT, and a controller to control switching from the first OLT to the standby OLT.

An optical termination system according to another embodiment of the invention includes a first OLT to communicate with a plurality of ONUs through an optical transmission line, a standby OLT, and a controller to control switching from the first OLT to the standby OLT, the controller having a control information storage to store control information of the plurality of ONUs that communicate with the first OLT, and to control switching access to the control information storage from the first OLT to the standby OLT.

An optical termination system according to still another embodiment of the invention includes an optical transmitter/receiver to connect with a plurality of ONUs through an optical transmission line, a first OLT electronic unit to communicate with the plurality of ONUs using the optical transmitter/receiver, the first OLT electronic unit having a control information storage to store control information of the plurality of ONUs, a standby OLT electric unit having a storage to store the control information to be transferred from the first OLT electric unit, and a controller to control switching from the first OLT electric unit to the standby OLT electric unit. The present invention can switch from a working OLT to a standby OLT much quicker compared to prior art. Since the standby OLT can use the control information of the working OLT, a blank period caused by the switching is shortened.

BRIEF DESCRIPTION OF THE DRAWINGS

The above and other objects, features and advantages of the present invention will be apparent from the following detailed description of exemplary embodiments of the invention in conjunction with the accompanying drawings, in which.

DETAILED DESCRIPTION

Explanatory embodiments of the invention are explained below in detail with reference to the drawings.

Figure 1:
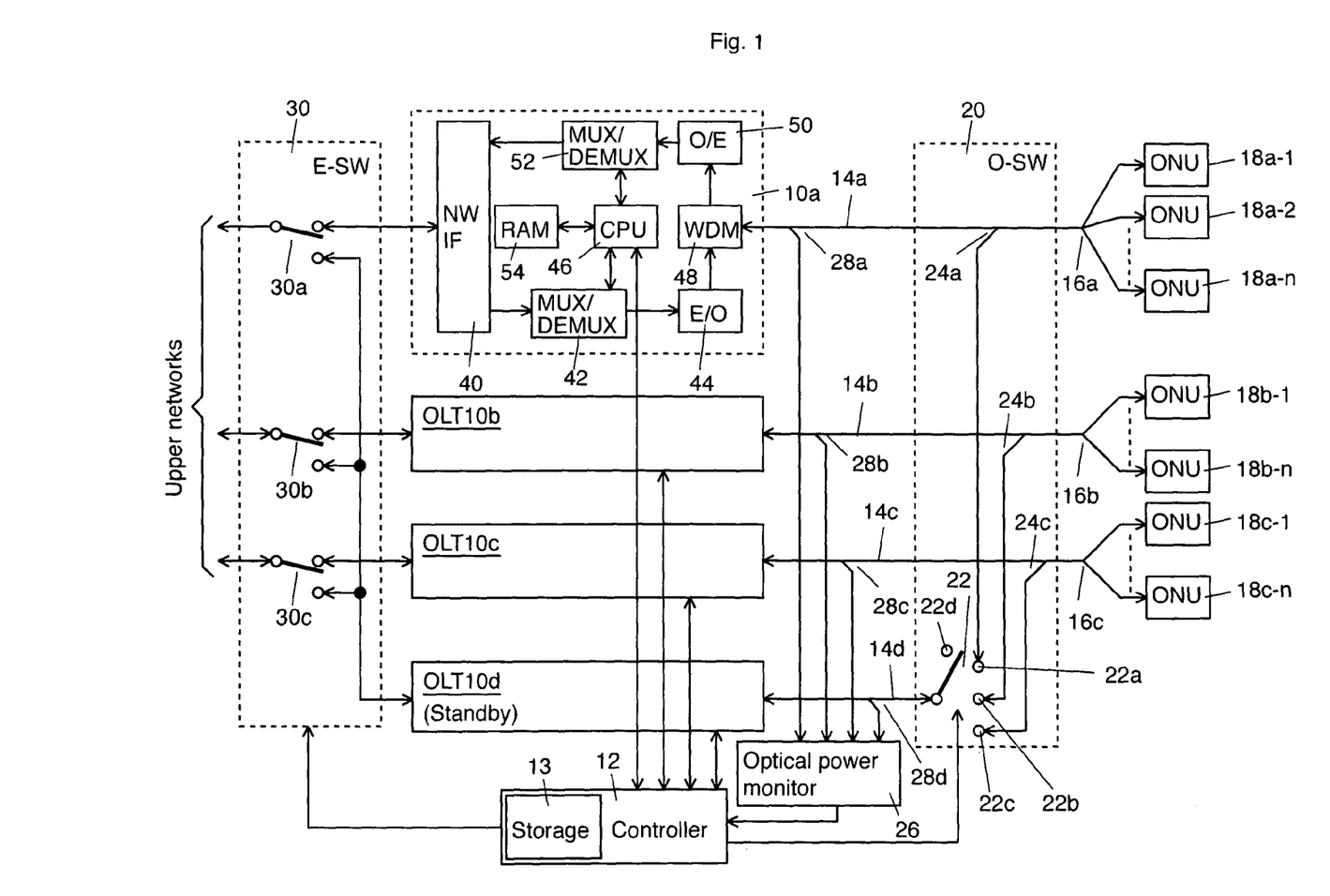
FIG. 1 shows a schematic block diagram of a first exemplary embodiment according to the invention.

FIG. 1 shows a schematic block diagram of a first exemplary embodiment according to the invention. In this embodiment, three working OLTs 10a, 10b, and 10c, a standby OLT 10d or protection OLT, and a controller 12 to switch one of the working OLTs 10a to 10c having a fault to the standby OLT 10d are disposed on a different slot in the same rack respectively. The OLTs 10a to 10d correspond to optical line terminals in claims. The controller 12 includes a storage 13 to temporally store the control information to be transferred to the standby OLT 10d from one of the OLTs 10a to 10c having a fault.

An optical input/output port of the OLT 10a connects to a plurality of ONUs 18a-1 to 18a-n through a first PON transmission line including an optical fiber 14a and an optical coupler 16a. Similarly, an optical input/output port of the OLT 10b connects to a plurality of ONUs 18b-1 to 18b-n through a second PON transmission line including an optical fiber 14b and an optical coupler 16b. An optical input/output port of the OLT 10c connects to a plurality of ONUs 18c-1 to 18c-n through a third PON transmission line including an optical fiber 14c and an optical coupler 16c. In this embodiment, those three PON systems are held at a single central office. The number of users (i.e. the number of ONUs) is expressed as n in all those three PON systems to indicate that those three PON systems have the same user capacity. However, in general, actual number of users differs in each PON system.

An optical input/output port of the standby OLT 10d connects to a common contact of an optical selector 22 in an optical switch 20 through an optical fiber 14d. The optical selector 22 in the optical switch 20 includes selective contacts 22a to 22d. The contact 22a connects to an optical coupler 24a on the optical fiber 14a, the contact 22b connects to an optical coupler 24b on the optical fiber 14b, and the contact 22c connects to an optical coupler 24c on the optical fiber 14c. The optical coupler 24a is an optical element to supply a signal light output from the optical input/output port of the OLT 10a and a signal light from the contact 22a of the optical selector 22 to the optical coupler 16a. The optical coupler 24a also splits the signal light from the optical coupler 16a into two portions to supply one portion to the optical input/output port of the OLT 10a and the other to the contact 22a of the optical selector 22. The optical couplers 24b and 24c also include optical elements identical to that of the optical coupler 24a.

The contact 22d is non-reflectively terminated. The optical selector 22 connects to the contact 22d when the OLT 10d is in a standby state. With this configuration, even though the standby OLT 10d is in the state to output signal lights, the signal lights from the OLT 10*d* do not enter any of the PON transmission lines. That is, it is possible to keep the OLT 10*d* powered on while it is in a standby state.

An optical power monitor 26 monitors optical power of downstream signal lights output from the optical input/output ports of the OLTs 10*a* to 10*d* to inform the monitored results to the controller 12. In order to monitor the downstream signal lights output from the optical input/output ports of the OLTs 10*a* to 10*d*, optical splitters 28*a* to 28*d* are disposed on the optical fibers 14*a* to 14*d* respectively, and downstream signal lights split by the optical splitters 28*a* to 28*d* enter the optical power monitor 26.

An electric switch 30 is disposed on the upstream side of the OLTs 10*a* to 10*d* to switch from one of the OLTs 10*a* to 10*c* to the standby OLT 10*d* when one of the OLTs 10*a* to 10*c* has a fault. Specifically, the electric switch 30 includes a switch 30*a* to selectively connect an upper network to an electric input/output port of the OLT 10*a* or 10*d*, a switch 30*b* to selectively connect an upper network to an electric input/output port of the OLT 10*b* or 10*d*, and a switch 30*c* to selectively connect an upper network to an electric input/output port of the OLT 10*c* or 10*d*.

The switch 30*a* normally connects the upper network to the electric input/output port of the OLT 10*a* while it connects the upper network to the electric input/output port of the OLT 10*d* when the OLT 10*a* has a fault. Similarly, the switch 30*b* normally connects the upper network to the electric input/output port of the OLT 10*b* while it connects the upper network to the electric input/output port of the OLT 10*d* when the OLT 10*b* has a fault. The switch 30*c* normally connects the upper network to the electric input/output port of the OLT 10*c* while it connects the upper network to the electric input/output port of the OLT 10*d* when the OLT 10*c* has a fault.

The configuration of the OLT 10*a* is explained next. A network interface 40 supplies signals from an upper network to a multiplexer/demultiplexer 42. The multiplexer/demultiplexer 42 supplies a portion of the signals from the network interface 40 to an electrooptical converter 44, the portion being addressed for the following ONU 18*a*-1 to 18*a*-n or for units located posterior to the ONUs, while it supplies a portion of the signals from the network interface 40 to a CPU 46, the portion being addressed for the OLT 10*a* itself. The CPU 46 supplies the signals addressed for the following ONU 18*a*-1 to 18*a*-n (e.g. control signals to control the ONU 18*a*-1 to 18*a*-n) to the multiplexer/demultiplexer 42. The multiplexer/demultiplexer 42 supplies the received signals also to the electrooptical converter 44. The multiplexer/demultiplexer 42 has a function to convert a data frame structure of a signal from the network interface 40 into a data frame structure suitable for a PON system.

The electrooptical converter 44 converts an electric signal from the multiplexer/demultiplexer 42 into an optical signal. The optical signals output from the electrooptical converter 44 enter the optical fiber 14*a* through a WDM optical coupler 48 and thereafter enter the ONUs 18*a*-1 to 18*a*-n through the optical coupler 16*a*.

The optical signals output from the ONUs 18*a*-1 to 18*a*-n enter the WDM optical coupler 48 through the optical coupler 16*a* and optical fiber 14*a*. The WDM optical coupler 48 supplies the optical signals from the optical fiber 14*a* to a photoelectric converter 50. The photoelectric converter 50 converts the optical signal from the WDM optical coupler 48 into an electric signal. The electric signal from the photoelectric converter 50 enters a multiplexer/demultiplexer 52. The multiplexer/demultiplexer 52 supplies a portion of the signals from the photoelectric converter 50 to the CPU 46, the portion being addressed for the OLT 10*a* itself (e.g. a signal to require the registration of logical link). The CPU 46 supplies the signals addressed for the upper network units to the multiplexer/demultiplexer 52. The multiplexer/demultiplexer 52 supplies the signal from the photoelectric converter 50 and the signal from the CPU 46 to the network interface 40 in a data frame format suitable for the data transmission in the upper networks. The network interface 40 transmits the signal from the multiplexer/demultiplexer 52 for the upper networks through the switch 30*a*.

The CPU 46 exchanges information with the following ONUs 18*a*-1 to 18*a*-n during the start-up process and stores the various sorts of their control information (specifically, the information of each ONU type (e.g. its manufacturer and firmware) etc.) and their set-up information (e.g. the information of a logical link to be assigned to each service for the ONU 18*a*-1 to 18*a*-n etc.) in a RAM 54. In this specification, the control information and the set-up information are collectively called the control information. The CPU 46 updates the control information in the RAM 54 whenever an ONU is newly started up. In addition, the CPU 46 monitors operating conditions of the OLT 10*a* and has a function to inform the controller 12 when any trouble is detected.

The configurations and functions of the OLTs 10*b*, 10*c* and 10*d* are also identical to those of the OLT 10*a*.

The controller 12 switches one of the OLTs 10*a* to 10*c* having a fault with the standby OLT 10*d* according to a warning from the OLT 10*a*, 10*b*, or 10*c* or information from the optical power monitor 26. The controller 12 sometimes switches one of the OLTs 10*a* to 10*c* having a fault with the standby OLT 10*d* according to a switching instruction from an operator. As the optical power monitor 26 monitors power of downstream signal lights from the OLTs 10*a* to 10*d*, the optical power monitor 26 can detect a fault occurrence such as a decrease of optical power below a certain level or an increase of optical power above a predetermined value, and informs the controller 12 which OLT is having a trouble.

Figure 2:
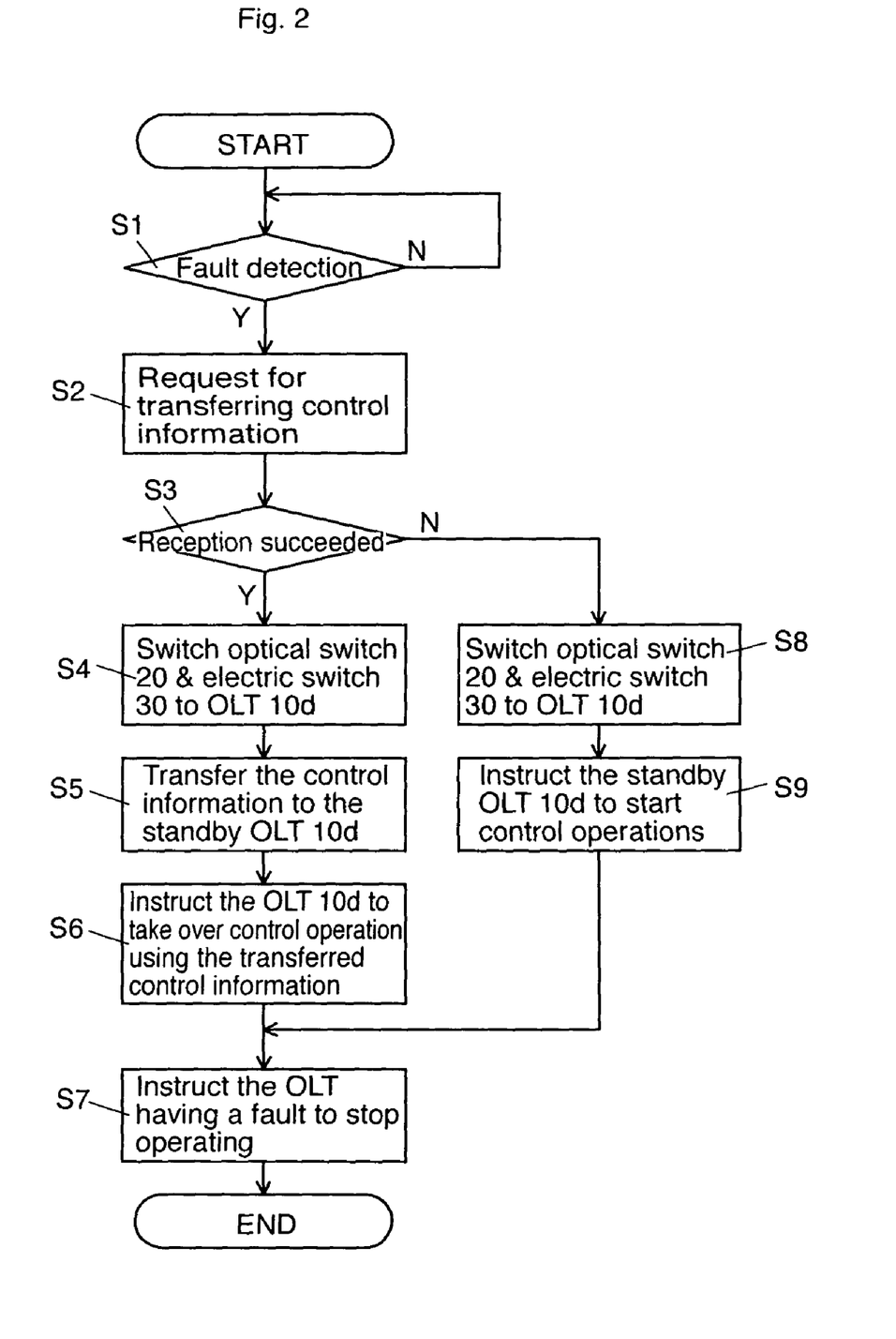
FIG. 2 shows a control flow chart of the first embodiment.

FIG. 2 shows a flow chart of OLT switching by the controller 12. When the OLT 10*a*, for example, has a fault, the controller 12 detects the fault occurrence in the OLT 10*a* according to an alarm from the OLT 10*a* or information from the optical power monitor 26 (S1) and requires the OLT 10*a* to send the control information stored in the RAM 54 (S2). The controller 12 stores the control information from the OLT 10*a* in the storage 13.

When the controller 12 succeeds in receiving all the control information from the OLT 10*a* (S3), it switches the optical switch 20 and electric switch 30 from the OLT 10*a* to the standby OLT 10*d* (S4). The controller 12 sends the control information from the OLT 10*a* stored in the storage 13 to the standby OLT 10*d* (S5) and instructs the OLT 10*d* to take over the functions of the OLT 10*a* (S6). A CPU 46 of the standby OLT 10*d* stores the control information from the controller 12 in a RAM 54 to take over the roles of controlling the ONUs 18*a*-1 to 18*a*-n and intermediating communications between the ONU 18*a*-1 to 18*a*-n and upper networks.

After the controller 12 confirms that the OLT 10*d* is normally operating, it instructs the OLT 10*a* to stop operating (S7). This instruction is to prevent abnormal operation by the OLT 10*a* such that the OLT 10*a* keeps outputting optical signals, for example. This includes a power-off instruction.

When the controller 12 fails to receive the control information from the OLT 10*a* (S3), it switches the optical switch 20 and electric switch 30 from the OLT 10*a* to the standby OLT 10*d* (S8). The controller 12 then instructs the standby OLT 10*d* to start the control of the ONJs 18*a*-1 to 18*a*-n (S9). According to the instruction, the OLT 10*d* starts an initial process of searching the ONUs 18*a*-1 to 18*a*-n as in the case of a power-on procedure (S9). The initial process takes about as much time as the reboot of the OLT takes. After the controller 12 confirms that the OLT 10d is normally operating, it instructs the OLT 10a to stop operating (S7).

As described above, according to the embodiment, as soon as a fault occurs in one of the OLTs, the OLT having a fault can be switched to a standby OLT. In conventional methods, since a standby OLT has to start from a process to search the following ONUs, switching of an OLT requires a long blank period, namely a long period of network disconnection. In this embodiment, when switching is performed urgently, a standby OLT takes over control information from an OLT having a fault and therefore a blank period caused by the switching process can be shortened.

In such a case that a single standby OLT is provided per a single working OLT, means corresponding to the optical switch 20 and electric switch 30 can be omitted by blocking outputs of the standby OLT 10d for both upstream side and downstream side before the switching while blocking outputs of the OLT having a fault for both upstream side and downstream side after the switching.

In addition when a single standby OLT is provided per a single working OLT, it is possible to continuously transfer the control information of the working OLT to a standby OLT, directly or through the controller 12, in advance or at update time of the control information. With this configuration, the time for transferring the control information can be saved when a fault occurs.

When a single standby OLT 10d is provided per a plurality of working OLTs 10a to 10c, it is possible that the control information of each working OLT is stored in the controller 12 continuously or at update time of the control information so that the controller 12 is capable of transferring the control information to a standby OLT 10d whenever a fault occurs. With this configuration, the control information of each working OLT can be used even in such a case that a working OLT breaks down so suddenly that there is no time to transfer the control information to the controller 12 or standby OLT 10d.

Figure 3:
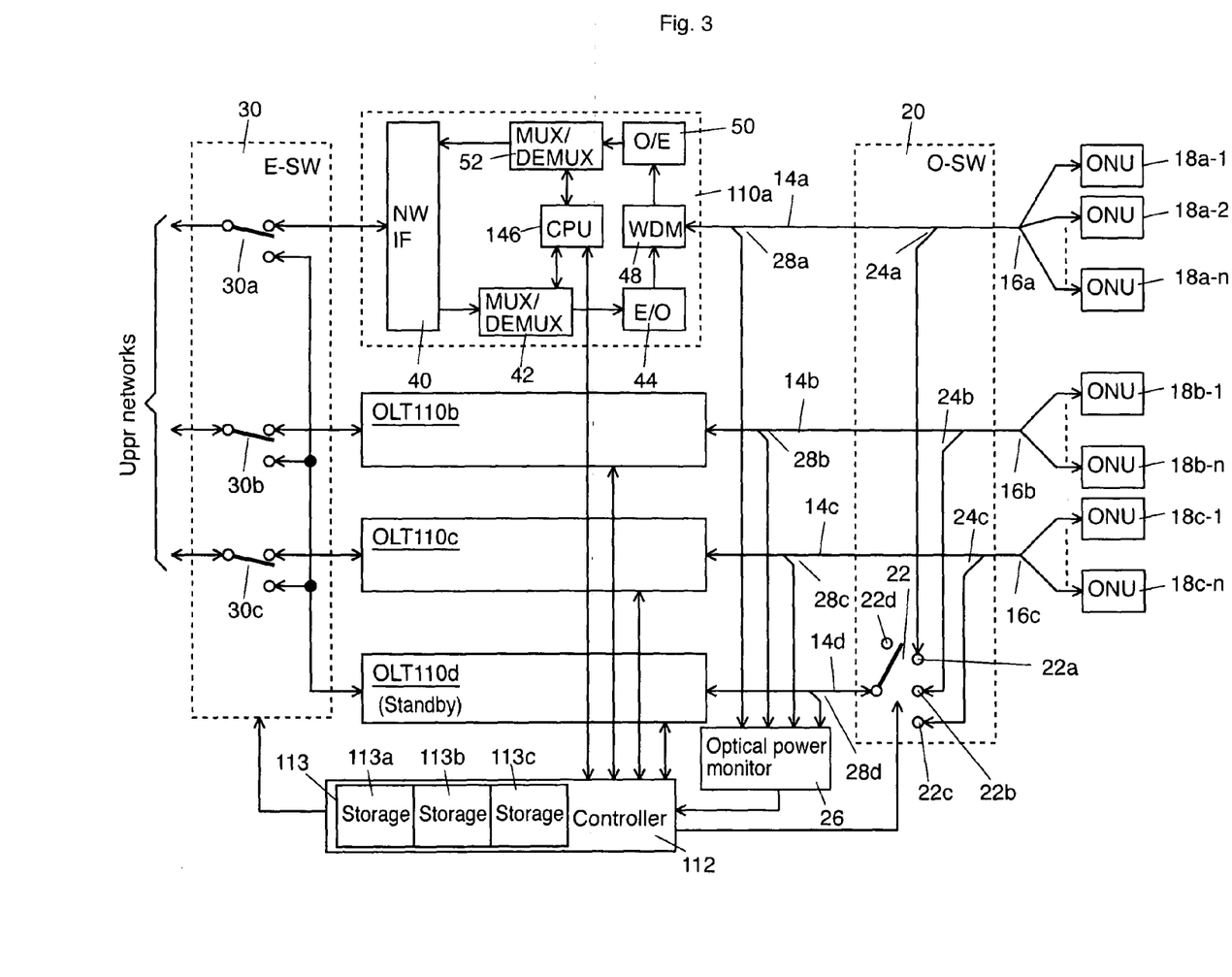
FIG. 3 shows a schematic block diagram of a second exemplary embodiment according to the invention.

FIG. 3 shows a schematic block diagram of a second exemplary embodiment according to the invention. In FIG. 3, elements identical to those in FIG. 1 have the common reference numerals.

This embodiment is configured so that control information of each working OLT is stored in a shared memory of a controller and the storage area storing the control information of an OLT having a fault is assigned to a standby OLT when the fault occurs. With this configuration, it is possible to save the time to transfer the control information from the OLT having a fault to the standby OLT. Furthermore, even if a working OLT has such a fault that interrupts transferring control information to a standby OLT, switching using the stored control information can be performed.

The operation of the part modified from the embodiment shown in FIG. 1 is explained next. OLTs 110a, 110b, and 110c are working and an OLT 110d is standby. A controller 112 includes a storage 113 to store control information of each of the OLTs 110a to 110c. That is, the control information of the OLT 110a is stored in a storage area 113a of the storage 113, the control information of the OLT 110b is stored in a storage area 113b of the storage 113, and the control information of the OLT 110c is stored in a storage area 113c of the storage 113.

A CPU 146 of each of the OLTs 110a to 110c stores its control information in the storage areas 113a to 113c of the controller 112 respectively just as the CPU 46 stores its control information in the RAM 54. The CPUs 146 supervise the following ONUs 18a-1 to 18a-n; 18b-1 to 18b-n; and 18c-1 to 18c-n respectively and control the communications of the ONUs using the control information stored in the storage 113 of the controller 112.

The operation at a fault occurrence is explained next. When a fault occurs in the OLT 110a, for example, the controller 112 detects that the OLT 110a has a fault according to a warning signal from the OLT 110a or an information signal from an optical power monitor 26. When the controller 112 detects the fault occurrence, it switches an optical switch 20 and an electric switch 30 from the OLT 110a to the standby OLT 110d and allows a CPU 146 of the standby OLT 110d to access the storage area 113a. The above procedures correspond to steps S2 to S5 in the flowchart shown in FIG. 2. The controller 112 instructs the OLT 110d to take over the duties of the OLT 110a using the control information stored at the storage area 113a of the storage 113. The CPU 146 of the OLT 110d takes over the control operations of the ONUs 18a-1 to 18a-n and the intermediation between the ONUs 18a-1 to 18a-n and upper networks based on the control information at the storage area 113a according to the instruction from the controller 112.

After the controller 112 confirms that the OLT 110d is normally operating, it instructs the OLT 110a to stop operating. This procedure is to deal with such conditions that the OLT 110a is no longer capable of operating normally. The stop instruction includes power-off of the OLT 110a.

In this embodiment, the control information is stored in a shared memory and therefore switching of an OLT can be completed only by switching the access to the shared memory whenever a fault occurs in an OLT. That is, the time to transfer control information from an OLT having a fault to a standby OLT can be saved. With this configuration, the control duties can be taken over much faster compared to the first embodiment and accordingly a blank period caused by a switching process can be further shortened.

Figure 4:
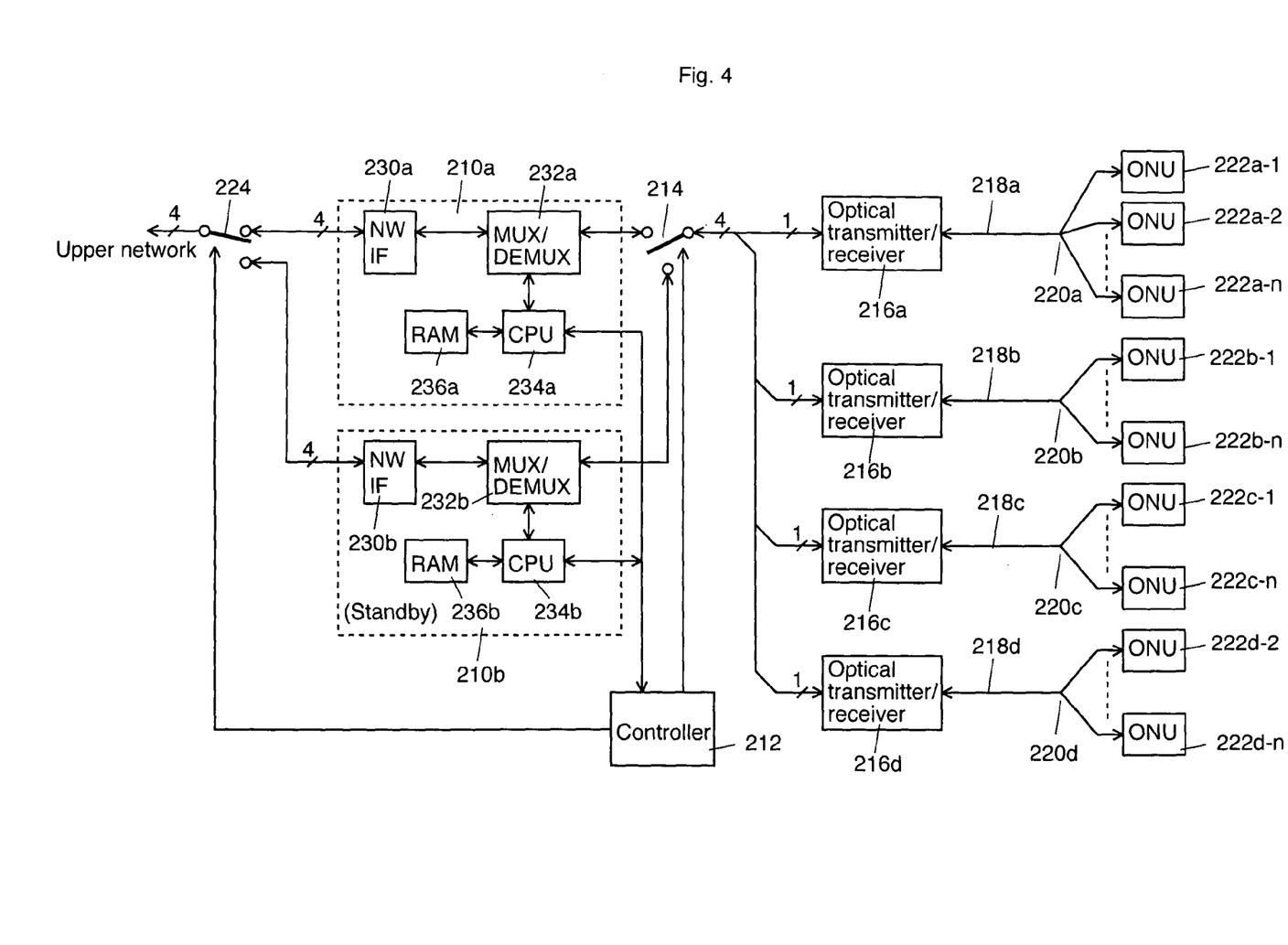
FIG. 4 shows a schematic block diagram of a third exemplary embodiment according to the invention.

FIG. 4 shows a schematic block diagram of a third exemplary embodiment according to the invention. In this embodiment, a signal OLT unit can include four PON systems.

Recently, quality of optical components has been remarkably improved. Electric components are likely to develop problems more often than optical components. In this embodiment, therefore, an electric component in an OLT is designed to switch with a standby component whenever it has a fault.

For a working OLT electric unit 210a, a standby OLT electric unit 210b having the same configuration with the unit 210a and a controller 212 to switch from the OLT electric unit 210a to the OLT electric unit 210b when a fault occurs in the OLT electric unit 210a are provided.

A switch 214 is an electric switch that normally selects a downstream input/output port (4-channel) of the OLT electric unit 210a while it selects a downstream input/output port (4-channel) of the OLT electric unit 210b when the OLT electric unit 210a has a fault. The switch 214 connects each channel of selected input/output ports with four parallel optical transmitters/receivers 216a, 216b, 216c, and 216d. Each of the optical transmitters/receivers 216a to 216d includes optical elements corresponding to the electrooptical converter 44, the WDM optical coupler 48, and the photoelectric converter 50 in the embodiment shown in FIG. 1.

The optical input/output port of the optical transmitter/receiver 216a connects to a plurality of ONUs 222a-1 to 222a-n through a first PON transmission line including an optical fiber 218a and an optical coupler 220a. Similarly, the optical input/output port of the optical transmitter/receiver 216b connects to a plurality of ONUs 222b-1 to 222b-n through a second PON transmission line including an optical fiber 218b and an optical coupler 220b. The optical input/output port of the optical transmitter/receiver 216c connects to a plurality of ONUs 222c-1 to 222c-n through a third PON transmission line including an optical fiber 218c and an optical coupler 220c. The optical input/output port of the optical transmitter/receiver 216d connects to a plurality of ONUs 222d-1 to 222d-n through a fourth PON transmission line including an optical fiber 218d and an optical coupler 220d.

Although the identical number n is assigned to all of the four PON systems as the number of users (i.e. the number of ONUs), this is to merely show that the capacity of users is the same in the four PON systems and actual numbers of users in the four PON systems are generally different.

A switch 224 to select the OLT electric unit 210a or 210b is disposed between the OLT electric units 210a, 210b and upper networks. The switch 224 normally connects an upper network with the OLT electric unit 210a and, when the OLT electric unit 210a has a fault, the switch 224 connects the upper network with the standby OLT electric unit 210b. A controller 212 controls the switch 224 interlocking with the switch 214.

In a configuration that the standby OLT electric unit 210b does not output electric signals in a standby state and the OLT electric unit 210a does not output electric signals when it has failure, the switches 214 and 224 can be terminals to electrically connect to both OLT electric units 210a and 210b. For example, the controller 112 controls the standby OLT electric unit 210b so that it does not output electric signals while the OLT electric unit 210a is operating and the controller 112 controls the OLT electric unit 210a so that it does not output electric signals after the standby OLT electric unit 210b is switched to operate in place of the OLT electric unit 210a.

Signals from the upper network enter a network interface 230a in the OLT electric unit 210a through the switch 224. The network interface 230a supplies the signals from the upper network to a multiplexer/demultiplexer 232a. Out of the signals from the network interface 230a, the multiplexer/demultiplexer 232a supplies signal addressed for the following ONU 222 (222a-1 to 222a-n; 222b-1 to 222b-n; 222c-1 to 222c-n; and 222d-1 to 222d-n) or even lower unit to the switch 214 while it supplies signal addressed for the OLT 210a itself to a CPU 234a. The CPU 234a supplies the signal addressed for the following ONU 222 (e.g. control signal to control the ONU 222) to the multiplexer/demultiplexer 232a and the multiplexer/demultiplexer 232a supplies those signals also to the switch 214 through a corresponding channel. The multiplexer/demultiplexer 232a includes a function to convert a data frame format of a signal from the network interface 230a into a data frame format suitable for a PON system.

The switch 214 supplies electric signals from the OLT electric unit 210a to the optical transmitters/receivers 216a to 216d. The optical transmitters/receivers 216a to 216d convert the electric signals from the switch 214 into optical signals and output them into optical fibers 218a to 218d respectively. The optical signals propagated in the optical fibers 218a to 218d enter ONUs 222 through the optical couplers 220a to 220d respectively.

The optical signals output from the ONUs 222 enter the optical transmitters/receivers 216a to 216d through the optical couplers 220a to 220d and the optical fibers 218a to 218d respectively. The optical transmitters/receivers 216a to 216d convert the optical signals from the optical fibers 218a to 218d into electric signals. The electric signals enter the multiplexer/demultiplexer 232a of the OLT electric unit 210a through the switch 214.

Out of the signals from the optical transmitters/receivers 216a to 216d, the multiplexer/demultiplexer 232a supplies the signal addressed for the OLT 210a itself (e.g. signal to request logical link registration) to the CPU 234a. The CPU 234a outputs the signal addressed for the upper network to the multiplexer/demultiplexer 232a. Out of the signals from the optical transmitters/receivers 216a to 216d, the multiplexer/demultiplexer 232a supplies the signal addressed for the upper network and the signal from the CPU 234a to the network interface 230a in a data frame format suitable for the data transmission in the upper network. The network interface 230a supplies the signals from the multiplexer/demultiplexer 232a to the upper network through the switch 224.

The CPU 234a, similar to the CPU 46, exchanges information with the following ONUs 222 during start-up to store the various control information in a RAM 236a. The CPU 234a also updates the control information in the RAM 236a whenever an ONU is newly powered on. The CPU 234a also monitors operating conditions of the OLT 210a so that it can inform the controller 212 when the OLT 210a has a failure.

The OLT electric unit 210b includes a network interface 230b, a multiplexer/demultiplexer 232b, a CPU 234b, and a RAM 236b, each having identical function to the corresponding element of the working OLT electric unit 210a.

In this embodiment, the working OLT electric unit 210a sends the control information to the controller 212 whenever it stores or updates the control information in the RAM 236a. The controller 212 transmits the control information from the OLT electric unit 210a to a CPU 234b in the OLT electric unit 210b. The CPU 234b in the OLT electric unit 210b stores the control information from the controller 212 in an RAM 236b. As described above, a copy of the control information of the working OLT electric unit 210a is continually stored in the RAM 236b of the standby OLT electric unit 210b. With this configuration, even if the working OLT electric unit 210a has a fault, the standby OLT electric unit 210b can take over the functions of the working unit 210a without initial procedures.

The controller 212 changes the switches 214 and 224 from the OLT electric unit 210a to the standby OLT electric unit 210b according to a warning or information of a fault occurrence from the OLT 210a. At the same instant, the controller 212 instructs the OLT electric unit 210b to take over the control and intermediate duties of the unit 210a while instructing the OLT electric unit 210a to be terminated or powered off. According to the instruction, the OLT electric unit 210b takes over the functions to control the ONUs 222 and to intermediate communications between the ONUs 222 and the upper network using the control information stored in its own RAM 236b. The OLT electric unit 210a is powered off according to the termination instruction from the controller 212.

As explained above, in this exemplary embodiment, since the control/setting information is mirrored to a standby unit in advance, the standby unit can skip the initial process when a fault occurs, which shortens a blank period caused by the switching operation.

The controller 212 can be connected to the OLT electric units 210a and 210b either through a common base or through a separate signal line. A common base has some merits, as wiring is simple and communication functions of the CPUs 234a, 234b and controller 212 can be easily equipped on common ground. While the invention has been described with reference to the specific embodiment, it will be apparent to those skilled in the art that various changes and modifications can be made to the specific embodiment without departing from the spirit and scope of the invention as defined in the claims.

The invention claimed is:

1. An optical termination system comprising:
a plurality of Optical Line Terminals (OLTs), each of the plurality of OLTs configured to communicate with a plurality of Optical Network Units (ONUs) through an optical transmission line, and having a control information storage to store control information for each respective plurality of ONUs to control communication with the plurality of ONUs;
a standby OLT having a storage capable of storing the control information to be transferred from each of the plurality of OLTs; and
a controller to identify control information relating to a plurality of ONUs that communicate with an OLT detected having a fault, to transfer the control information relating to the plurality of ONUs that communicate with an OLT detected having a fault from the OLT having a fault to the standby OLT, to control switching from the OLT having a fault to the standby OLT, and to intermediate transmission of the control information relating to the plurality of ONUs that communicate with an OLT detected having a fault from the OLT having a fault to the standby OLT while maintaining communication of remainder of the plurality of OLTs, other than the OLT having a fault, with respective plurality of ONUs.

2. The optical termination system of claim 1 wherein
the controller is configured to block the standby OLT from outputting to the plurality of ONUs before switching from the OLT having a fault to the standby OLT, and wherein
the controller is configured to stop the OLT having a fault from outputting to the plurality of ONUs after switching from the OLT having a fault to the standby OLT.

3. The optical termination system of claim 1, further comprising:
a first switch being controlled by the controller to selectively connect an optical input/output port of the standby OLT with the optical transmission line; and
a second switch being controlled by the controller to selectively connect an upstream input/output port of the standby OLT with a computer network including the plurality of OLTs.

4. The optical termination system of claim 1 wherein the control information comprises information of each ONU type including manufacturer and firmware; and set-up information including information of a logical link to be assigned to each service for each ONU.

5. An optical termination system comprising:
a plurality of OLTs, each of the plurality of OLTs configured to communicate with a plurality of ONUs through an optical transmission line;
a standby OLT; and
a controller to identify control information relating to the plurality of ONUs that communicate with an OLT detected having a fault, to transfer the control information from the OLT having a fault to the standby OLT, and to control switching from the OLT having a fault to the standby OLT while maintaining communication of remainder of the plurality of OLTs, other than the OLT having a fault, with respective plurality of ONUs, the controller having a control information storage to store control information for each of the plurality of ONUs to control communication of each of the plurality of OLTs with the plurality of ONUs, and to control switching access to the control information storage from the OLT having a fault to the standby OLT.

6. The optical termination system of claim 5 wherein
the controller is configured to block the standby OLT from outputting to the plurality of ONUs before switching from the OLT having a fault to the standby OLT, and wherein
the controller is configured to stop the OLT having a fault from outputting after switching from the OLT having a fault to the standby OLT.

7. The optical termination system of claim 5, further comprising:
a first switch being controlled by the controller to selectively connect an optical input/output port of the standby OLT with the optical transmission line; and
a second switch being controlled by the controller to selectively connect an upstream input/output port of the standby OLT with a computer network including the plurality of OLTs.

8. The optical termination system of claim 5 wherein the control information comprises information of each ONU type including manufacturer and firmware; and set-up information including information of a logical link to be assigned to each service for each ONU.

9. A method for operating an optical termination system, the optical termination system having a plurality of Optical Line Terminals and at least one standby Optical Line Terminal, the method comprising:
storing control information in each of the plurality of Optical Line Terminals, the control information being used to control communication of each of the plurality of the Optical Line Terminals with a plurality of Optical Network Units;
detecting a fault in one of the plurality of Optical Line Terminals;
switching from the Optical Line Terminal detected with a fault to one of the at least one standby Optical Line Terminal;
transferring control information relating to the plurality of Optical Network Units that communicates with the Optical Line Terminal detected having a fault from the Optical Line Terminal detected having a fault to the standby Optical Line Terminal;
controlling the standby Optical Line Terminal to begin functioning; and
controlling the Optical Line Terminal detected with a fault to stop operating while maintaining communication of remainder of the plurality of OLTs, other than the OLT having a fault, with respective plurality of ONUs.

10. The method for operating the optical termination system as claimed in claim 9, further comprising:
searching a plurality of Optical Network Units to construct control information; and
storing the control information within the standby Optical Line Terminal.

11. The method for operating the optical termination system as claimed in claim 9 wherein the control information comprises information of each ONU type including manufacturer and firmware; and set-up information including information of a logical link to be assigned to each service for each ONU.

12. A method for operating an optical termination system having a plurality of Optical Line Terminals and at least one standby Optical Line Terminal, the method comprising:
storing control information in each of the plurality of Optical Line Terminals, the control information being used to control communication of each of the plurality of the Optical Line Terminals with a plurality of Optical Network Units;

continuously transferring control information from each of the plurality of Optical Line Terminals to a controller;

detecting a fault in one of the plurality of Optical Line Terminals;

switching from the Optical Line Terminal detected with a fault to one of the at least one standby Optical Line Terminal;

transferring control information in the controller to the standby Optical Line Terminal, wherein the control information transferred to the standby Optical Line Terminal pertains to the control information originally stored in the Optical Line Terminal detected with a fault, and relates to the plurality of Optical Network Units that communicates with the Optical Line Terminal detected having a fault;

controlling the standby Optical Line Terminal to start functioning; and controlling the Optical Line Terminal detected with the fault to stop operating while maintaining communication of remainder of the plurality of OLTs, other than the OLT having a fault, with respective plurality of ONUs.

13. A method for operating an optical termination system having a plurality of Optical Line Terminals and at least one standby Optical Line Terminal, the method comprising:

storing control information in a controller, the control information being used to control communication of each of the plurality of the Optical Line Terminals with a plurality of Optical Network Units;

detecting a fault in one of the plurality of Optical Line Terminals;

switching access to the control information in the controller from the Optical Line Terminal detected with a fault to one of the at least one standby Optical Line Terminal, the control information relating to the plurality of Optical Network Units that communicates with the Optical Line Terminal detected having a fault;

controlling the standby Optical Line Terminal to start functioning; and controlling the Optical Line Terminal detected with the fault to stop operating while maintaining communication of remainder of the plurality of OLTs, other than the OLT having a fault, with respective plurality of ONUs.

14. A method for operating the optical termination system having a plurality of Optical Line Terminals and at least one standby Optical Line Terminal, the method comprising:

continuously transferring control information from one of the plurality of Optical Line Terminals to a dedicated standby Optical Line Terminal, the control information relating to the plurality of Optical Network Units that communicates with the Optical Line Terminal and being used to control communication of each of the plurality of the Optical Line Terminals with the plurality of Optical Network Units, wherein the dedicated standby Optical Line Terminal is one of the at least one standby Optical Line Terminal and is dedicated to one of the plurality of Optical Line Terminals;

detecting a fault in one of the plurality of Optical Line Terminals, wherein switching occurs between the Optical Line Terminal detected with a fault and the dedicated standby Optical Line Terminal, the dedicated standby Optical Line Terminal being dedicated to the Optical Line Terminal detected with a fault;

controlling the dedicated standby Optical Line Terminal to start functioning; and controlling the Optical Line Terminal detected with the fault to stop operating while maintaining communication of remainder of the plurality of OLTs, other than the OLT having a fault, with respective plurality of ONUs.

* * * * *